Dec. 17, 1929.   J. SZILAGYI   1,740,277
CHICKEN BROODER
Filed May 29, 1928
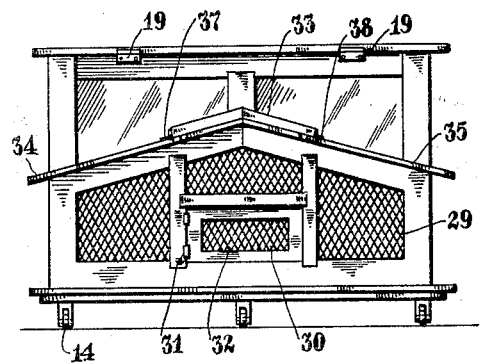
Fig. 1.
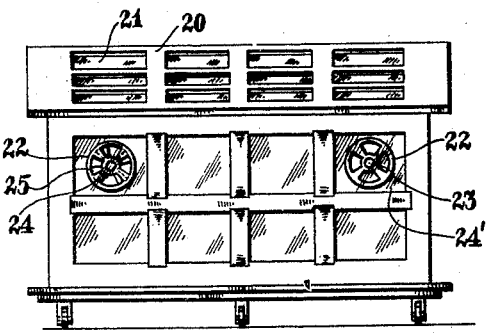
Fig. 3.
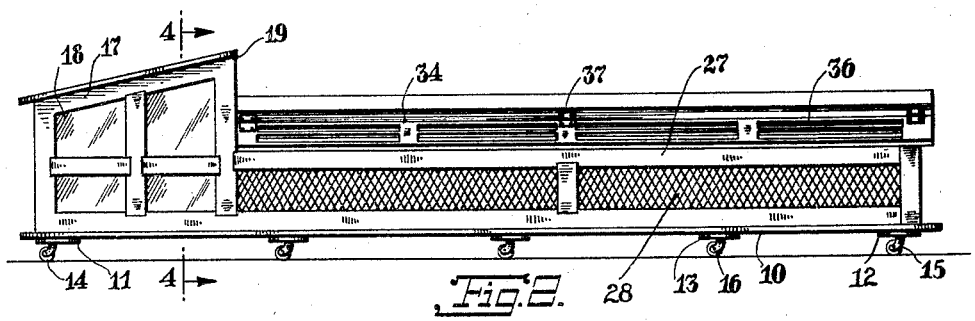
Fig. 2.
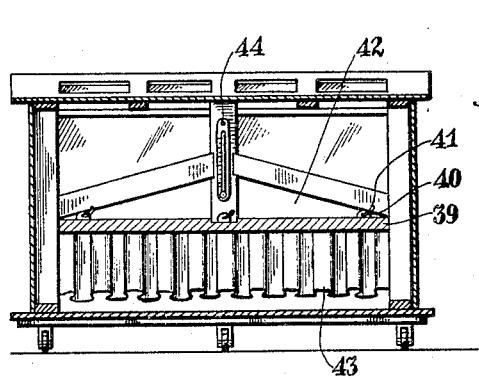
Fig. 4.
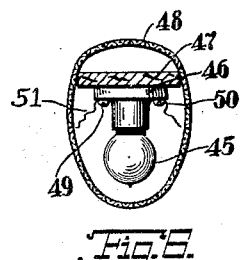
Fig. 6.
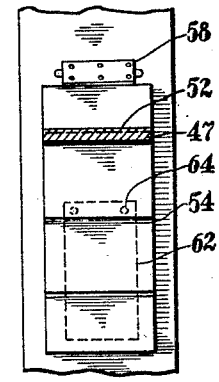
Fig. 7.
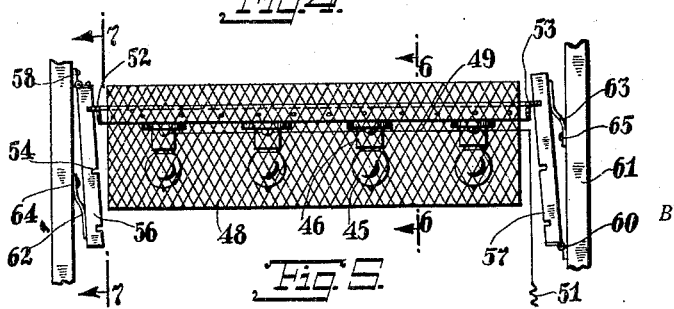
Fig. 5.
INVENTOR.
Julius Szilagyi
BY
ATTORNEY Patented Dec. 17, 1929

1,740,277

UNITED STATES PATENT OFFICE

JULIUS SZILAGYI, OF NEW YORK, N. Y.

CHICKEN BROODER

Application filed May 29, 1928. Serial No. 281,419.

This invention relates to a new and useful device in the nature of a brooder especially adapted for the raising of infant chickens and embodies improvements in devices of this nature which will facilitate the raising of infant chickens and insure the safety and expedite the growth of the chickens.

The object of the invention is to provide a device of the class described of novel construction and arrangement of parts hereinafter more fully described, claimed and illustrated in the accompanying drawing.

Fig. 1 is a front elevational view of my improved brooder.

Fig. 2 is a side elevational view thereof.

Fig. 3 is a rear elevational view thereof.

Fig. 4 is a transverse sectional view taken on the line 4—4 of Fig. 2.

Fig. 5 is an enlarged fragmentary view showing in particular the adjustable perch as embodied in my improved device.

Fig. 6 is a vertical sectional view taken on the line 6—6 of Fig. 5.

Fig. 7 is a similar sectional view taken on the line 7—7 of Fig. 5.

As here embodied my improved brooder comprises a base 10 or support of rectangular shape, having secured thereto at either end thereof, at its bottom side cross members 11 and 12, and a central cross member 13. Castors 14, 15 and 16, such as generally used to facilitate the moving of furniture and the like are mounted on the underside of the base 10.

At one end of the base 10 is constructed a coop or enclosure 17, of frame like construction, suitably covered or enclosed with transparent material 18, preferably glass. The coop 17, has hinged thereto, as at 19, at the upper edge thereof, a roof 20 of frame like construction suitably enclosed or covered with transparent material 21.

A pair of ventilators 22, of the rotating type are secured to the pins 23 rotatively mounted in the transparent members 24', forming part of the rear closure of the above described coop. The ventilators 22 are of circular disc shape construction having formed therein openings 24 adapted to register with similar shape openings 25 formed in the transparent members 24', as a means of providing proper ventilation for the said coop. The transparent members 24' may be covered with screening not shown on the drawing, preferably of fine wire mesh as a means of preventing rodents or other destructive agents from entering the coop through the said ventilators.

An extended enclosure 27 is constructed on the base 10, and extends from the above mentioned coop to the opposite or far end of the base 10. The said enclosure 27 is of frame like construction having the sides suitably covered as at 28 by screening, preferably of fine wire mesh. The end of the said enclosure 27 is similarly covered as at 29, and has hinged thereto as at 31, a suitable door 30, opening inwardly so as to permit the chickens to enter the enclosure. The door 30 is of frame like construction covered with screening 32, similar to the above described screening.

The central top longitudinal portion of the enclosure 27 is covered as at 33, preferably by galvanized metal or any suitable rust resisting composition metal. The roof proper comprises a pair of frame like members 34 and 35, suitably covered with a transparent material 36, and hinged as at 37 and 38, respectively, to the central top portion, so as to provide access to the said enclosure 27.

The above mentioned and described enclosure 27 is constructed rigid with the above mentioned and described coop so as to permit the chickens to pass at will from the coop into the enclosure, so as to provide the necessary exercise.

A support 39, has secured thereto eyelets 40, adapted to removably engage the hooks 41 secured to and extended from the end member 42 of the said coop adjacent to the said enclosure. The support 39 is horizontally disposed, and has secured thereto and extended therefrom strips 43, of soft flexible material, preferably felt, for the purpose of preventing drafts of wind, or currents of air from entering the coop, without restricting the chickens from entering or leaving the coop.

A thermometer 44, of the usual conventional type, such as commonly used for recording temperatures, is secured to the end member 42 of the coop, for the purpose of determining the temperature in the coop, which must obviously be kept within a prescribed range in order to insure the proper health of the chickens.

A plurality of electric light bulbs 45, are removably mounted in the sockets 46, in the usual wellknown manner, secured to the under side of the support 47. The support 47 is covered with a screen 48, preferably of medium wire mesh, suitably formed or curved so as to enclose or cover the electric light bulbs 45. Suitable electric light wires 49 and 50, properly insulated, are connected to the sockets 46 and are extended therefrom, and coiled, or loosely wound, as at 51, so as to provide a certain amount of slack which will permit the support 47 to be freely moved without interfering with the said wires 49 and 50. The wires 49 and 50 are extended through suitable openings formed in the above mentioned coop and are connected to any suitable, convenient source of electric current, not shown in the accompanying drawing.

The support 47 has secured thereto at the opposite ends thereof and extended therefrom angle brackets 52 and 53, adapted to removably engage in any desired one of the elongated openings 54 and 55, respectively, formed in the engaging members 56 and 57. The engaging member 56, is hinged at its upper edge as at 58 to a portion 59 of one side of the frame of the above mentioned coop. The engaging member 57, is hinged at its lower edge as at 60 to the portion 61 of the side of the frame work directly opposite the engaging member 56. Springs 62 and 63, are secured at one extremity as at 64 and 65, to the portions 59 and 61, and are shaped or formed so as to normally urge the said engaging members outwardly from the sides of the coop.

The above described construction is such as will permit the said support 47 to function as a perch upon which the chickens may alight and rest. The said perch is raised or lowered as may be desired to accommodate chickens of various sizes and ages.

Having thus described my invention, what I claim as new and desire to protect by Letters Patent of the United States is as follows:—

1. In a brooder of the class described, a plurality of electric light bulbs removably mounted in sockets secured to the under side of a support, said support covered with screening, suitably formed so as to enclose the said electric light bulbs, electric light wires connected to the said sockets and to any convenient source of electric current, said support having secured thereto at the opposite ends thereof and extended therefrom angle brackets adapted to removably engage in any desired elongated openings formed in engaging members, one of said engaging members being hinged at its upper edge to the side of the frame of a coop, a second engaging member hinged at its lower edge to the side of the frame of the said coop directly opposite the first mentioned side of the said coop, springs secured to the said sides of the said coop, said springs formed so as to normally urge the said engaging members outwardly from the sides of the said coop.

2. In combination with a brooder of the class described, a perch removably mounted on engaging members, secured to a coop, electric light bulbs mounted in electric light sockets secured to the said perch, said sockets operatively connected to any suitable source of electric current as a means of providing heat for chickens on the said perch, said perch covered with screening, suitably formed so as to enclose the said perch, said perch having secured thereto at the opposite ends thereof and extended therefrom angle brackets adapted to removably engage in any desired elongated openings formed in engaging members, one of said engaging members hinged at its upper edge to the side of the frame of a coop, a second engaging member hinged at its lower edge to the side of the frame of the said coop directly opposite the first mentioned side of the said coop, springs secured to the said sides of the said coop, said springs formed so as to normally urge the said engaging members outwardly from the sides of the said coop.

In testimony whereof I have affixed my signature.

JULIUS SZILAGYI.